United States Patent [19]

Chang et al.

[11] Patent Number: 5,115,876
[45] Date of Patent: May 26, 1992

[54] AUTOMATIC WEIGHING SYSTEM FOR POWDER

[75] Inventors: Yuen-Wai Chang, Taipei Hsien; Chiou-Fwu Chen, Yilan Hsien, both of Taiwan

[73] Assignee: Gain Lab Corp., Taipei, Taiwan

[21] Appl. No.: 667,449

[22] Filed: Mar. 11, 1991

[51] Int. Cl.⁵ .............................................. G01G 19/00
[52] U.S. Cl. ..................................... 177/145; 177/54; 177/146
[58] Field of Search ................. 177/54, 136, 145, 146, 177/163; 235/87 A, 89 A

[56] References Cited

U.S. PATENT DOCUMENTS

| | | | |
|---|---|---|---|
| 2,616,652 | 11/1952 | Rose et al. | 177/54 |
| 4,002,215 | 1/1977 | Harvill | 177/146 |
| 4,526,095 | 7/1985 | Rewitzer | 177/146 |
| 4,589,507 | 5/1986 | Curran | 177/146 |
| 4,673,048 | 6/1987 | Curran | 177/146 |
| 4,705,470 | 11/1987 | Penta | 177/145 |

*Primary Examiner*—Benjamin R. Fuller
*Assistant Examiner*—Randy W. Gibson
*Attorney, Agent, or Firm*—Dellert, Smith-Hill and Bedell

[57] ABSTRACT

An automatic weighing system comprises at lease one carrier movable along a track device for carrying powder. The carrier has a base plate on which a turn table is rotatably disposed. The turn table has a plurality of cut-out portions each configured to support a container to be filled with powder. A lifting unit is provided on the base plate to support a weighing device for weighing powder. The container is supported by the lifting unit when the weighing device is in an extended position and is supported by the turn table when the lifting unit is in a retracted position. A first driving device is mounted on the base plate for driving the carrier, and a second driving device, also mounted on the base plate, is provided for controlling a rotational movement of the turn table.

5 Claims, 5 Drawing Sheets

1

AUTOMATIC WEIGHING SYSTEM FOR POWDER

BACKGROUND OF THE INVENTION

The present invention relates to a weighing system for powder, and more particularly, to an automatic weighing system which provides a turn table for carrying a plurality of weighing containers.

Most weighing systems for powdery chemicals or medications are designed to automatically control the weighing and mixing of the powder to prevent from contamination of the working environment and to avoid injury to the health of the operators who are in charge of these procedures. However, an inconvenience arising from these systems is the inefficiency in conveying powder since each single carrier, for weighing interval, only can carry a single container to be weighed.

Another disadvantage of conventional powder weighing systems is that the powder collecting units thereof do not function effectively. For example, as shown in FIG. 6 of the drawings, powder outputted from an outlet of a feeding pipe 90 falls into a container 94 disposed on a plate 93 of a weighing unit 92. A dust shield 95 covers the whole weighing unit and the outlet of the feeding pipe 90 to prevent the powder from escaping into the environment, causing contamination, and to prevent undesired external dust or the like from entering the weighing system. A powder collecting pipe 96 is provided on the dust shield 95 to collect floating powder. As indicated by the arrows in FIG. 6, floating powder is carried by an air stream and then sucked away via the powder collecting pipe 96. Yet the air stream passes through the feeding powder stream and results in that powder having a smaller dimension, which should be fed into the container 94, will be carried away by the air stream, resulting in inefficient weighing. Furthermore, powder will accumulatively adhere to the inner surface of the powder collecting pipe 96 and, after a period of time, will fall into the container 94, thus affecting the accuracy of weighing. Moreover, the air stream created for carrying the floating powder is often too strong, thus affecting the weighing accuracy.

The present invention provides an improved weighing system to mitigate and/or obviate the above-mentioned problems.

SUMMARY OF THE INVENTION

It is an object of the present invention to provide an improved automatic weighing system in which each carrier carries a plurality of containers for weighing for interval.

It is another object of the present invention to provide an automatic weighing system in which automatic conveying means are provided for feeding the containers to and removing the containers from the carrier after completion of weighing.

It is still another object of the present invention to provide an automatic weighing system in which the powder collecting unit is improved to sustain the accuracy of the weighing unit.

It is yet another object of the present invention to provide an automatic weighing system which comprises more than one weighing scale for optional weighing under different desired weighing accuracies.

These and additional objects, if not set forth specifically herein, will be readily apparent to those skilled in the art from the detailed description provided hereunder, with appropriate reference to the accompanying drawings.

DETAILED DESCRIPTION OF THE PREFERRED EMBODIMENTS

Figure 1:
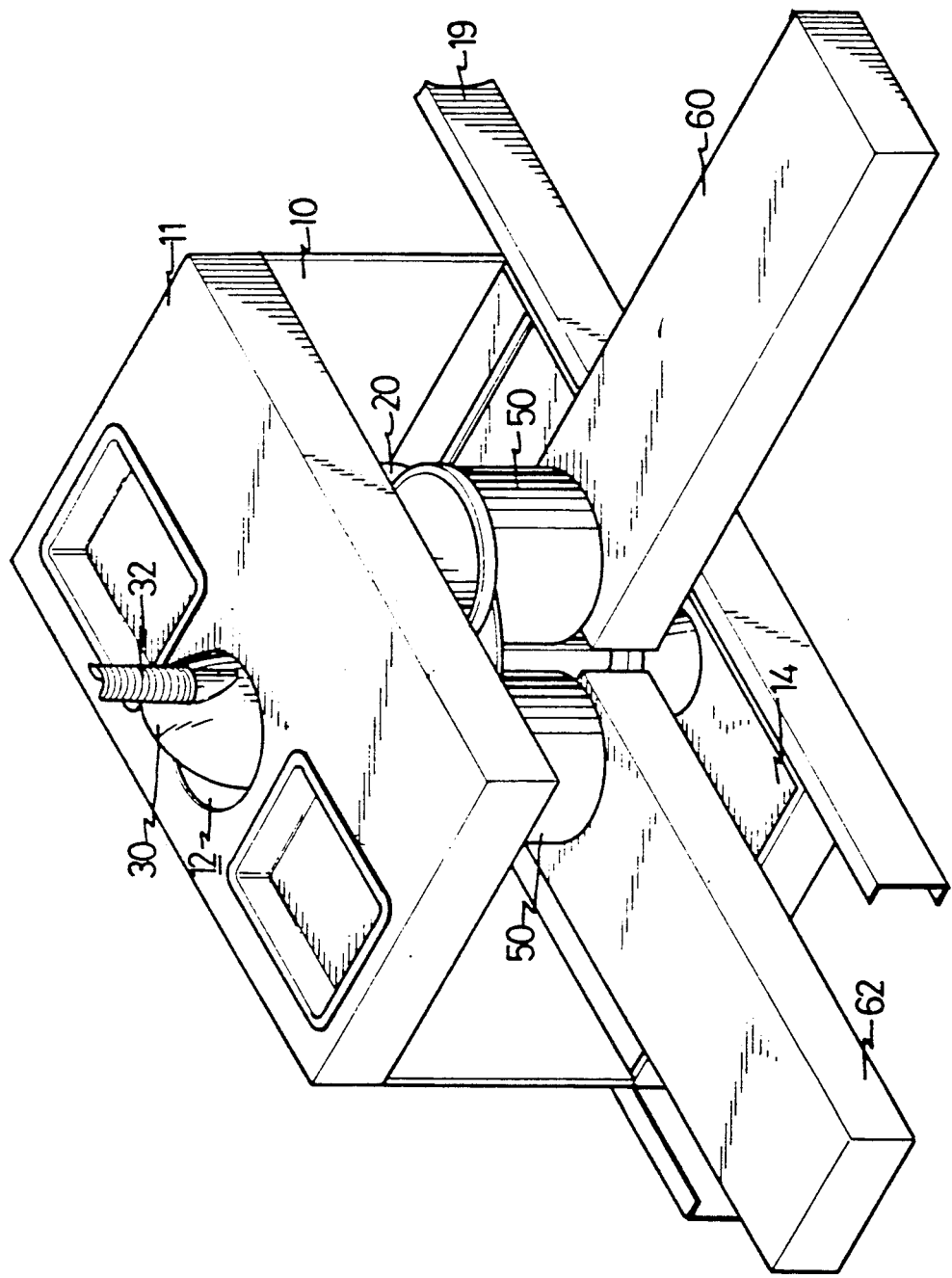
FIG. 1 is a perspective view of an automatic weighing system for powder in accordance with the present invention.
Figure 2:
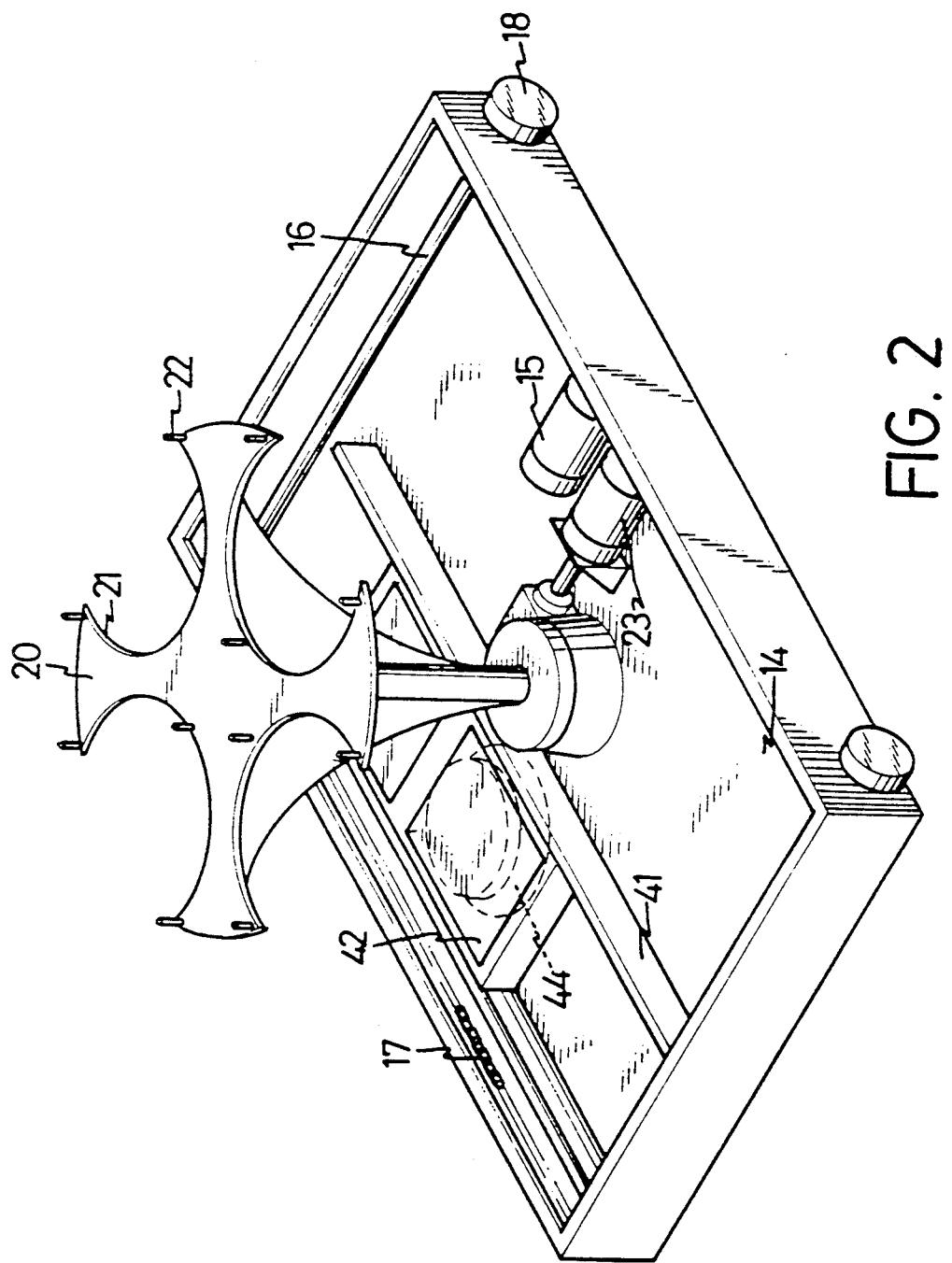
FIG. 2 is a perspective view showing a weighing unit of the automatic weighing system in which a cover plate is removed to show the inner arrangement of a carrier.

Referring to FIGS. 1 and 2, an automatic weighing system according to the present invention comprises at lease one carrier 10 movable along a track means 19. The carrier 10 has an upper dust proof cover 11 with a powder feeding inlet 12 formed therein. A dust shield 30 is provided adjacent to the powder feeding inlet 12 to partially cover the powder feeding inlet 12 without affecting the feeding of powder. On the dust shield 30 a powder collecting pipe 32 is provided for collecting floating powder in the carrier 10. The powder collecting pipe 32 extends downward through the dust shield 30 and the dust proof cover 11 to an upper inner space of the carrier 10, which will be discussed in detail later. An upper end of the powder collecting pipe 32 is connected to a suction means (not shown) which is the power source for removing floating powder in the carrier 10.

Still referring to FIG. 2, in which the upper dust proof cover 11 is removed to show the inner arrangement of the carrier 10. The carrier 10 has a base plate 14 on which a first driving means 15 is mounted for driving the carrier 10 along the track means 19. The carrier 10 has two pairs of wheels 18 (only two are shown in FIG. 2) with each pair connected by a shaft 16. The two shafts 16 are connected by two chains 17 (only one chain is shown in FIG. 2) for transmitting power. The unshown chain is driven by the first driving means 15. The wheels 18 are movable in the track means 19 such that the displacement of the carrier 10 can be accurately controlled by the first driving means 15.

A turn table 20 is rotatably disposed at the center portion of the base plate 14. The turn table 20 has four cut-out portions 21 each configured to support a container 50 thereon. A plurality of support pins 22 are provided on the turn table 20 adjacent to the cut-out portions 21, such that various types of containers with an reinforced upper edge can be used in the carrier 10 for containing powder. A second driving means 23 is mounted on the base plate 23 to control the rotational movement of the turn table 20. The number of containers that can be carried for each interval depends on the number of cut-out portions 21 of the turn table 20. In this embodiment, the carrier 10 can carry four containers for each interval.

Figure 4:
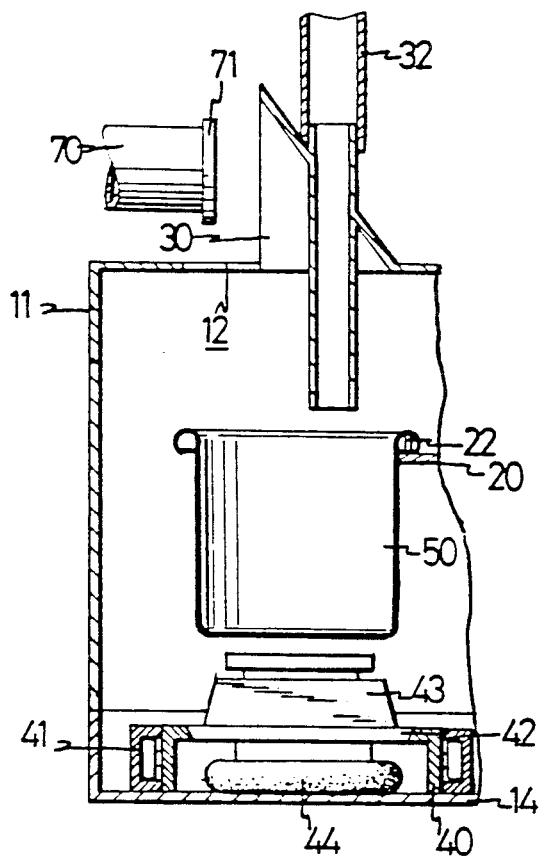
FIGS. 4 and 5 are cut-away cross-sectional views of the automatic weighing system showing the weighing of powder.
Figure 5:
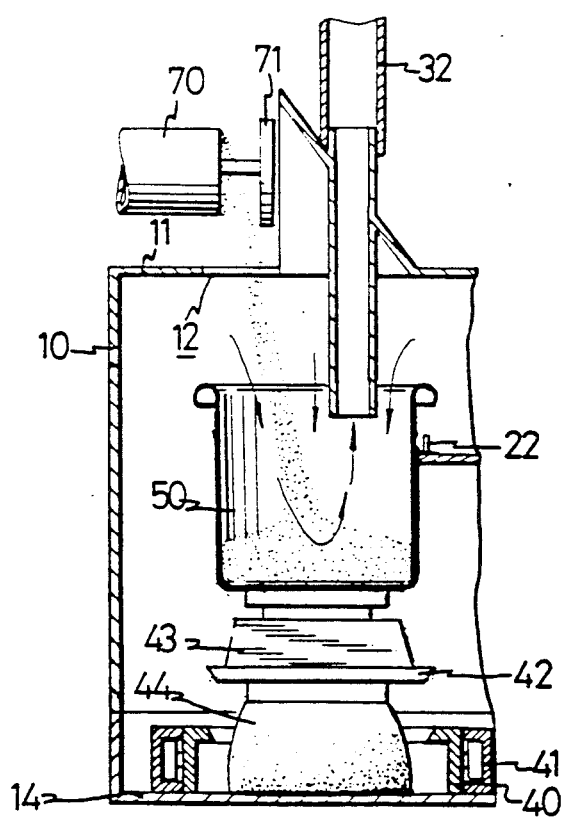
Figure 6:
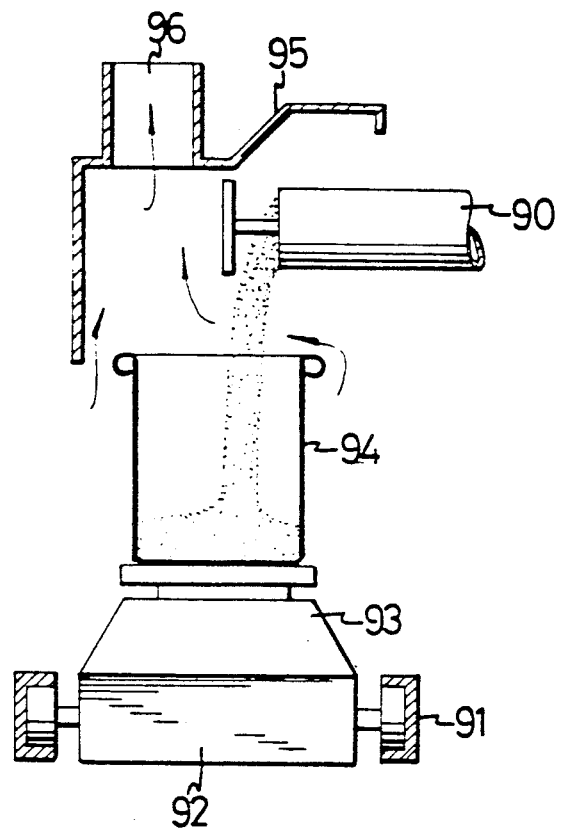

Referring to FIGS. 4 and 5, in which the weighing of powders is shown, a lifting unit, such as an inflatable air bag 44, is provided on the base plate 14. A weighing means, such as a weighing scale 43, is supported by a support plate 42. When the air bag 44 is in a collapsed status, i.e., not during a weighing condition, the weighing scale 43 is supported by the support plate 42, which in turn, is supported by a frame 40 on the base plate 14. The support plate 42, together with the weighing scale 43, will be supported by the air bag 44 when the air bag 44 is in an inflated status, i.e., during a weighing condition.

FIG. 4 shows that the inflatable air bag 44 is in a collapsed status and one container 50 is supported by the turn table 20. When the carrier 10 reaches a weighing station for filling and weighing powder, the air bag 44 is inflated to lift the plate 42 and the weighing scale 43. As shown in FIG. 5, the support plate 42, together with the weighing scale 43, is lifted such that the container 50 makes contact with the weighing scale 43, thereby lifting the container 50. After the air bag 44 is completely inflated, the container 50 is directly supported by the weighing scale 43 instead of the support pins 22 of the turn table 20. Then a cap 71 of a feeding pipe 70 is opened to allow powder to be dispensed from the feeding pipe 70 to fall into the container 50. The suction means is started to create an air steam to remove floating powder from the weighing system via the powder collecting pipe 32. As can be seen in FIG. 5, a lower end of the powder collecting pipe 32 is in an upper portion of the container 50 when the air bag 44 is in an inflated status. When the suction means operates, the air stream flows from the environment of the container 50 into the container 50, and then passes through the lower end of the powder collecting pipe 32 to exit the weighing system. The path of the air stream does not pass through the powder feeding path and thus will not interfere with the feeding of powder. Furthermore, the required air stream is relatively small, which will not interfere with the weighing function. Accordingly, the weighing accuracy can be assured. In addition, it is impossible for the powder to adhere to the inner surface of the dust proof cover 11, which reassures the weighing accuracy without the risk of the accumulation of powder on the inner surface of the dust proof cover 11 which would tend to fall into the container 50, encountered in conventional weighing systems. Moreover, when the suction means operates, the air stream flows from the environment into the container, which creates a pressure field around the opening of the container, thus further preventing the contamination of the powder.

When the feeding of powder is completed (i.e., after weighing of the container), the air bag collapses to the original position as shown in FIG. 4. The turn table 20 is then rotated by the second driving means 23 through 90° to bring the filled container away from the weighing scale 43, and to bring one of the remaining three empty containers 50 to a position above the weighing scale 42 for subsequent feeding and weighing. Such procedure repeats until all four containers are filled and weighed.

Figure 3:
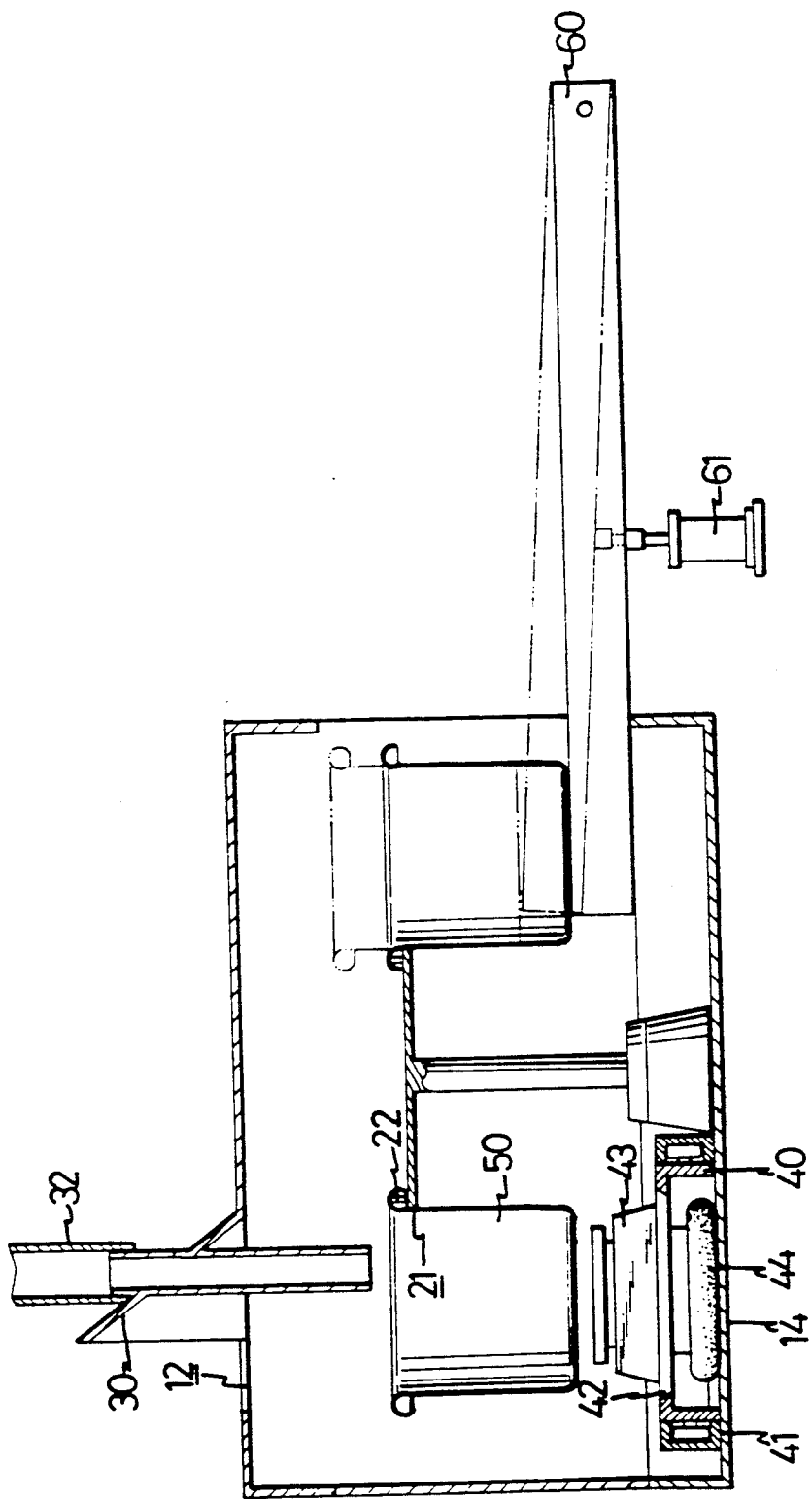
FIG. 3 is a schematic side view, partially in cross-section, of the automatic weighing system showing the removal of containers from the carrier after completion of weighing.

After completion of weighing of all four containers, the carrier 10 is moved under the control of the first driving means 15 to another station for replacing the filled containers with new empty containers. Referring to FIGS. 1 and 3, at this station, a first conveying means 60 is provided for removing the filled containers from the turn table 20 of the carrier 10, and a second conveying means 62 is provided for feeding empty containers to the turn table 20 after completion of filling and weighing of powder.

FIG. 3 shows the removal of the filled containers. The first conveying means 60 is lifted by a lifting means, such as a pneumatic cylinder 61, to lift one of the filled containers to a position such that the filled container is above the support means 22, as shown in phantom lines in FIG. 3. The filled container, which is no longer supported by the support pins 22 but supported by the first conveying means 60, is conveyed by the first conveying means 60 to a desired position. The first conveying means 60 is then lowered by the pneumatic cylinder 61 to the original position, as shown in solid lines in FIG. 3. Next the turn table 20 is rotated by the second driving means 23 through 90° to bring another filled container to be conveyed. In the mean time, an empty container is conveyed by the second conveying means 62 to the newly available cut-out portion 21 of the turn table 20. The operation of the feeding of the empty container is as follows: the second conveying means 62 is lifted by a lifting means, such as a pneumatic cylinder (not shown), then the empty container is conveyed to be placed in the newly available cut-out portion, and then the second conveying means 62 is lowered by the pneumatic cylinder, which is substantially the same as the operation of the first conveying means 60.

After the filled containers are replaced, the carrier 10 is readily movable to the weighing station for the next batch of powder feeding.

Referring to FIG. 2, the support plate 42 can be designed to be movable in a track unit 41 on the base plate 14. The weighing system may further utilize a second support plate which is also movable in the track unit 41. A second weighing scale can be provided on the second support plate. The second weighing scale may have a weighing accuracy different from that of the first weighing scale. This can be accomplished by a simple movement of the first and second support plates to provide a selection of weighing accuracies for powder weighing. It is understood that the number of the weighing scales can be greater than two, which is only a choice of design.

While the present invention has been explained in relation to its preferred embodiment, it is to be understood that various modifications thereof will be apparent to those skilled in the art upon reading this specification. Therefore, it is to be understood that the invention disclosed herein is intended to cover all such modifications as fall within the scope of the appended claims.

I claim:

1. An automatic weighing system comprising:
at least one carrier movable along a track means for carrying powder, said carrier having a base plate on which a turn table is rotatably disposed, said turn table having a plurality of cut-out portions each configured to support a container to be filled with said powder;

a lifting unit provided on said base plate;

a weighing means for weighing said container supported by said lifting unit, said container being supported by said weighing means when said lifting unit is in an extended position and being supported by said turn table when said lifting unit is in a retracted position;

a first driving means mounted on said base plate for driving said carrier; and a second driving means mounted on said base plate for controlling a rotational movement of said turn table.

2. An automatic weighing system as claimed in claim 1, wherein a plurality of support pins are provided on said turn table adjacent to said cut-out portions for supporting said container.

3. An automatic weighing system as claimed in claim 1, further comprising:
    a first conveying means for removing filled containers from said turn table of said carrier; and
    a second conveying means for feeding empty containers to said turn table after completion of filling and weighing of said powder.

4. An automatic weighing system as claimed in claim 1, further comprising an upper dust proof cover with a powder feeding inlet formed therein through which powder is fed into said container, a dust shield being provided adjacent to said powder feeding inlet to partially cover said powder feeding inlet without affecting the feeding of said powder, a powder collecting pipe being provided on said dust shield for collecting floating powder, a first end of said powder collecting pipe is connectable to a means for suction and a second end of said powder collecting pipe is in an upper portion of said container during said powder feeding.

5. An automatic weighing system as claimed in claim 1, wherein said lifting unit and said weighing means are movable in a track unit on said base plate; and further comprising a second weighing means for weighing said container, supported by a second lifting unit which is also movable in said track unit, said second weighing means having a weighing accuracy different from that of the weighing means first mentioned to provide a selection of powder weighing under desired weighing accuracies.

* * * * *